US008592029B2

(12) United States Patent
Heiche et al.

(10) Patent No.: US 8,592,029 B2
(45) Date of Patent: Nov. 26, 2013

(54) CORROSION RESISTANT SUBSTRATE AND METHOD FOR PRODUCING THE SAME

(75) Inventors: Gunter Heiche, Schwaigern (DE); Peter Koenig, Wiesloch (DE)

(73) Assignee: Gerhard Heiche GmbH, Schwaigern (DE)

( * ) Notice: Subject to any disclaimer, the term of this patent is extended or adjusted under 35 U.S.C. 154(b) by 845 days.

(21) Appl. No.: 12/224,085

(22) PCT Filed: Feb. 22, 2007

(86) PCT No.: PCT/DE2007/000339
§ 371 (c)(1),
(2), (4) Date: Sep. 15, 2008

(87) PCT Pub. No.: WO2007/095927
PCT Pub. Date: Aug. 30, 2007

(65) Prior Publication Data

US 2009/0050182 A1 Feb. 26, 2009

(30) Foreign Application Priority Data

Feb. 24, 2006 (DE) ........................ 10 2006 009 116

(51) Int. Cl.
*B32B 5/14* (2006.01)

(52) U.S. Cl.
USPC .......................................... 428/323

(58) Field of Classification Search
USPC .......................................... 428/323
See application file for complete search history.

(56) References Cited

U.S. PATENT DOCUMENTS

| | | | | |
|---|---|---|---|---|
| 2,117,236 | A | 5/1938 | Beard et al. | |
| 4,440,582 | A | 4/1984 | Smith et al. | |
| 4,487,815 | A | 12/1984 | Dorsett et al. | |
| 4,586,963 | A | 5/1986 | Smith et al. | |
| 4,731,264 | A | 3/1988 | Lin et al. | |
| 5,393,611 | A | 2/1995 | Flamme | |
| 6,153,854 | A * | 11/2000 | Haszler et al. | 219/121.64 |
| 6,200,693 | B1 | 3/2001 | Nakada et al. | |
| 6,375,726 | B1 | 4/2002 | Matzdorf et al. | |
| 6,403,164 | B1 * | 6/2002 | Jonschker et al. | 427/387 |
| 6,413,446 | B1 | 7/2002 | Mechtel et al. | |
| 6,436,475 | B1 * | 8/2002 | Adler et al. | 427/358 |
| 6,511,532 | B2 | 1/2003 | Matzdorf et al. | |
| 6,521,029 | B1 | 2/2003 | Matzdorf et al. | |
| 6,527,841 | B2 | 3/2003 | Matzdorf et al. | |

(Continued)

FOREIGN PATENT DOCUMENTS

| | | | |
|---|---|---|---|
| DE | 100 16 181 | A1 | 11/2000 |
| DE | 100 25 637 | A1 | 12/2001 |

(Continued)

OTHER PUBLICATIONS

International Preliminary Report on Patentability and Written Opinion of the International Searching Authority [English Translation] dated Oct. 14, 2008.

*Primary Examiner* — Mike M Dollinger
(74) *Attorney, Agent, or Firm* — Dickinson Wright PLLC

(57) ABSTRACT

A corrosion resistant substrate is provided having a Cr(VI) free corrosion resistant two layer coating. The substrate is substantially comprised of aluminum, an aluminum alloy, magnesium or a magnesium alloy. A first wet chemical deposited inorganic passivation layer is directly positioned on the substrate and a second organic modified polysiloxane layer is directly positioned on the passivation layer.

33 Claims, 5 Drawing Sheets

(56) References Cited

U.S. PATENT DOCUMENTS

| | | | | |
|---|---|---|---|---|
| 6,592,945 | B2 | 7/2003 | Suzuki et al. | |
| 6,905,775 | B1 | 6/2005 | Barlow et al. | |
| 2001/0019774 | A1 | 9/2001 | Suzuki et al. | |
| 2003/0027020 | A1 | 2/2003 | Berg et al. | |
| 2004/0065389 | A1 | 4/2004 | Kolberg et al. | |
| 2004/0067313 | A1 | 4/2004 | Hauser | |
| 2004/0091384 | A1* | 5/2004 | Tanaka et al. | 420/407 |
| 2004/0097641 | A1 | 5/2004 | Wagner | |
| 2004/0159188 | A1* | 8/2004 | Pekguleryuz et al. | 75/604 |
| 2005/0179010 | A1* | 8/2005 | Lin | 252/387 |
| 2005/0282003 | A1 | 12/2005 | Mayzel et al. | |
| 2006/0016690 | A1* | 1/2006 | Ostrovsky | 205/104 |
| 2006/0099332 | A1 | 5/2006 | Eriksson et al. | |
| 2006/0191671 | A1 | 8/2006 | Boger et al. | |
| 2006/0234072 | A1 | 10/2006 | Ostrovsky | |
| 2006/0278310 | A1* | 12/2006 | Kinzler | 148/549 |
| 2007/0017602 | A1 | 1/2007 | Koch et al. | |
| 2007/0190259 | A1 | 8/2007 | Bittner et al. | |
| 2007/0298174 | A1 | 12/2007 | Kolberg et al. | |
| 2008/0127859 | A1 | 6/2008 | Kolberg et al. | |
| 2008/0138615 | A1 | 6/2008 | Kolberg et al. | |

FOREIGN PATENT DOCUMENTS

| | | | |
|---|---|---|---|
| DE | 101 52 853 | A1 | 5/2003 |
| DE | 103 15 944 | A1 | 10/2004 |
| DE | 10 2005015576 | A1 | 10/2006 |
| EP | 0 274 428 | A | 7/1988 |
| WO | WO 2006/108655 | A | 10/2006 |

* cited by examiner

X Siloxane fragments
o Isocyanate fragments

CORROSION RESISTANT SUBSTRATE AND METHOD FOR PRODUCING THE SAME

BACKGROUND

1. Field

The invention relates to a corrosion resistant substrate, particularly a substrate with a Cr(VI) free corrosion resistant coating and a method for producing the same.

2. Description of Related Art

Metal sheets and metal parts, for example made of steel and aluminum, are often provided with a coating which protects the sheet or part against corrosion by corrosive media and oxygen. Furthermore, with the support of this coating the adhesion of paints applied thereto may be improved, further improving the corrosion resistance of this part. The corrosion protection incorporating the coating is tested according to specified test conditions, such as tests applying atomized salt spray according to DIN 50 021 SS or outdoor weathering.

Some corrosion protection coatings comprise Cr(VI) containing compositions. However, because of the toxicity of Cr(VI), coatings containing Cr(VI) are no longer desirable. Consequently, Cr(VI) free substitute products, as for example described in U.S. Pat. No. 6,375,726 have been developed throughout the last years.

Some of the Cr(VI) free coating substitutes with acceptable corrosion protection properties already exist for standard corrosion protection conditions. However, the corrosion resistance of these Cr(VI) free coatings is inadequate for some substrate materials and in highly corrosive environments.

It is known from further testing that the corrosion protection of the currently available Cr(VI) free coatings is inadequate in highly corrosive acid containing atmospheres. For example, an acid containing atmosphere develops in exhaust gas systems of vehicles, particularly in exhaust gas systems with exhaust gas recirculation and waste gas systems. These applications comprise the further requirement that the coating also has to be corrosion resistant at higher temperatures, for example 120° C. or up to 250° C. However, the already developed Cr(VI) free coatings show signs of corrosion after a short amount of time under these conditions.

SUMMARY

This problem is even more critical in some metals and alloys, such as aluminum alloys, magnesium alloys and particularly in aluminum die cast alloys, which due to the added alloy components, such as copper, nickel, zinc, tin and/or iron, exhibit a poorer corrosion resistance. In addition it is desirable, that the coated blank metal is also corrosion resistant without an additional painting, bonding or rubber coating. This is desirable in parts such as bolts, which are incorporated into a larger installation and have to match with a second part exactly.

It is therefore an aim of the present invention to provide a Cr(VI) free corrosion resistant substrate, that has better corrosion resistance in highly corrosive atmospheres, particularly in acid containing atmospheres, as well as a method for producing the same.

This is achieved by the subject matter described herein.

According to the invention a corrosion resistant substrate having a Cr(VI) free, corrosion resistant two layer coating, is provided. The substrate desirably substantially contains aluminum or an aluminum alloy, but may substantially contain magnesium or a magnesium alloy. The first layer of the two layer corrosion resistant coating is a wet chemical deposited inorganic passivation layer, which is directly positioned on the substrate, i.e., is deposited directly on the substrate surface. The terms "first layer," "passivation layer," "lower passivation layer," "lower first passivation layer," "inorganic passivation layer," "first passivation layer," and "first inorganic passivation layer" as used herein all refer to this layer. The second layer is an organic modified polysiloxane layer. The terms "second layer," "upper layer," "polysiloxane layer," "second polysiloxane layer," "upper polysiloxane layer," "second upper polysiloxane layer," "organic modified polysiloxane layer," and "second organic modified polysiloxane layer" as used herein all refer to this layer. The polysiloxane layer is directly positioned on the passivation layer, i.e., is deposited directly on the surface of the passivation layer.

The corrosion resistant coating according to the invention therefore is comprised of two layers, each of which is free of Cr(VI). The lower passivation layer is inorganic and is deposited on the substrate by a wet chemical process. The upper layer is an organic modified polysiloxane layer. The combination of these two layers of the coating according to the invention provides an improved corrosion resistance.

In another embodiment is disclosed a method for producing a corrosion resistant substrate according to the invention that comprises the steps of: providing a substrate, which substantially comprises aluminum, an aluminum alloy, magnesium or an magnesium alloy. Depositing a inorganic passivation layer by a wet chemical process directly onto the substrate and subsequently depositing an organic modified polysiloxane layer directly onto the passivation layer. The organic modified polysiloxane layer may contain nano scale particles.

In another embodiment is disclosed an exhaust gas system containing the coated substrate described herein. In a particular embodiment, the exhaust gas system is a system for exhaust gas recirculation of a vehicle.

In another embodiment is disclosed a heating system containing the coated substrate described herein.

In another embodiment is disclosed a thermal system containing the coated substrate described herein.

In another embodiment is disclosed a waste gas system containing the coated substrate described herein.

In another embodiment is disclosed a method of reducing corrosion of a substrate having a surface containing aluminum, an aluminum alloy, magnesium, or a magnesium alloy, comprising:

- applying a wet chemical deposited inorganic passivation layer directly to the surface of the substrate; and
- applying an organic modified polysiloxane layer directly to the surface of the inorganic passivation layer.

DETAILED DESCRIPTION OF SPECIFIC EMBODIMENTS

Figure 1:
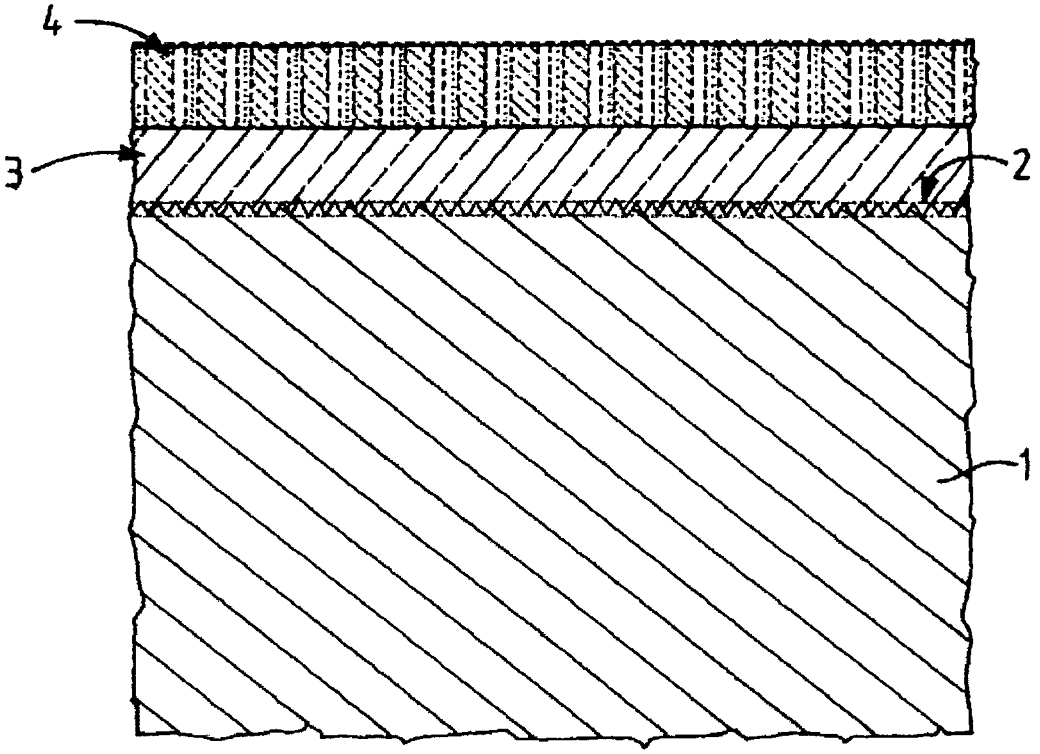
FIG. 1 shows a schematic view of the layer structure of a coated substrate according to an embodiment disclosed herein.

A two layer coating provides the possibility to optimize the characteristics of the two layers separately in order to realize an improved corrosion resistance. The adhesion of the first passivation layer to the material of the surface may, for example, be optimized, so that the complete two layer coating does not detach from the substrate and the surface of the substrate is completely covered.

The second organic modified polysiloxane layer may be optimized so that it adheres well to the first passivation layer and reliably covers the first passivation layer. The second layer, in principle, does not need to show a good adhesion to the substrate material because it is bonded to the passivation layer. Furthermore, the surface of the second organic modified polysiloxane layer may be optimized, so that it comprises properties which are not common to the lower first passivation layer.

In further embodiments the passivation layer and or the organic modified polysiloxane layer are free of phosphate. The expression "free of phosphate" also means free of phosphor. The substrate therefore does not comprise any phosphating or any phosphating layer. The two layer coating according to the invention therefore is suitable for a substrate which does not comprise a surface treatment.

The inorganic passivation layer may have different compositions. In one embodiment the passivation layer comprises Cr(III). Furthermore, this passivation layer may comprise Na and/or K and/or Zr. These elements may be present in the layer as ions.

In one embodiment the passivation layer is a conversion layer. A conversion layer comprises components of both the deposited passivation layer as well as the material of the substrate. The conversion layer is formed from a chemical reaction between the basic substrate and the conversion layer disposed thereon. This chemical reaction may lead to an improved adhesion between the passivation layer and the basic substrate.

A good coating with little or no porosity may be achieved by a thin passivation layer. In one embodiment the passivation layer has a thickness a of $0.2\ \mu m \leq a \leq 2\ \mu m$. An average thickness of approximately 0.5 μm has been proven to be useful in practice and may be realized reliably.

In one embodiment the organic modified polysiloxane layer comprises a cured cross-linked polymer network. The polysiloxane layer according to this embodiment therefore may be denoted a paint.

In one embodiment the organic modified polysiloxane layer comprises epoxy substituted polysiloxanes, which are cross-linked to a polymer network through inherently blocked isocyanates. Such compositions and the layer formed thereof are, for example, disclosed in DE 101 52 853. DE 101 52 853 is explicitly incorporated by reference to its full extent.

The second upper polysiloxane layer is produced so that it is dense and homogeneous and may provide a self-cleaning property due to low surface tensions. The contact angle may, for example, be 110°. Such a high density and homogeneity can be realized by a sol-gel forming mechanism, during which the layer is formed.

The deposition conditions, as well as the curing conditions, may be chosen so that the second upper polysiloxane layer is formed through nano scale components, in order to form a dense homogeneous layer. Depending on these conditions, the cured cross-linked polysiloxane layer may be nano crystalline. Depending both on the composition of the mixture and on the curing conditions the organic modified polysiloxane layer can be formed of nano scale particles.

In one embodiment of the invention the passivation layer is deposited from a solution, wherein the solution comprises at least one water soluble Cr(III) salt. The passivation layer may have a layer weight of from 100 $mg/m^2$ to 500 $mg/m^2$.

In one embodiment of the invention the organic modified polysiloxane layer according to the invention has a thickness d, wherein $1\ \mu m \leq d \leq 30\ \mu m$, preferably $2\ \mu m \leq d \leq 25\ \mu m$, $5\ \mu m \leq d \leq 25\ \mu m$ or $5\ \mu m \leq d \leq 15\ \mu m$, and in a further embodiment a thickness d, wherein $1\ \mu m \leq d \leq 3\ \mu m$. A thicker layer may be advantageous to improve the coverage of the layer on the substrate. A thicker layer may provide a improved corrosion resistance and therefore extend the lifetime of the surface. A dense stable layer comprising little porosity and a small layer thickness d of approximately 1 μm to 10 μm may be formed using a sol-gel process. This leads to a small consumption of material and hence to reduced production costs.

In one embodiment of the invention the substrate comprises an Al die cast alloy. As an Al die cast alloy substrate GD-AlSi12, GD-AlSi12(Cu), GD-AlMg3Si, GD-AlSi10Mg, GD-AlSi10Mg(Cu), GD-AlSi9Cu3 or GD-AlMg9 may be provided.

In a further embodiment of the present invention the substrate comprises an Al forging alloy. As an Al forging alloy substrate AlMg1, AlMg1.5, AlMgSi0.5 or AlZnMgCu0.5 may be provided.

In a further embodiment of the invention the substrate comprises one of the magnesium alloys AZ91, AM50 and AM60.

In one embodiment the substrate is used in an acid containing atmosphere and with temperatures of up to approximately 120° C. or up to approximately 250° C. This atmosphere may, for example, be comprised of waste gases. The substrate may be a part of an exhaust system of a vehicle, in particular a part of an exhaust system with exhaust gas recirculation, or a part of a heating system or a thermal system or a waste gas system.

Vehicles increasingly comprise parts made of aluminum, aluminum alloys and other light metals, such as magnesium and its alloys, which are increasingly used due to their low weight and their simple reprocessing of scrap parts. However, in line with the used car regulations of the EU and the regulations concerning scrapped electronics parts, Cr(VI) containing coatings are replaced. According to the invention, both of the two layers are free of Cr(VI), so that the combination of coatings according to the invention fulfills current and future environmental regulations. The substrate, which is corrosion resistant according to the invention, therefore may be advantageously used in vehicle applications.

In some applications it also is not desired to enlarge the size of parts, such as for example bolts, by additional paintwork, as this may complicate the assembly of an installation. Moreover, paintworks are not stable at the high temperatures of a vehicle exhaust gas system or an engine. Aluminum or magnesium based substrates comprising a Cr(VI) free two layer coating according to the invention have a good corrosion resistance even without an additional paintwork and may, therefore, be utilized advantageously for these applications as well. The invention also provides the use of a Cr(VI) free inorganic wet chemical deposited layer as a sub-layer of a corrosion resistant Cr(VI) free two layer coating deposited on an Al, Al alloy, Mg or Mg alloy substrate.

The invention also provides the use of a Cr(VI) free, nano particle comprising organic modified polysiloxane layer as an upper layer of a Cr(VI) free corrosion resistant two layer coating on a Al, Al alloy, Mg or Mg alloy substrate.

A method for producing a corrosion resistant substrate according to the invention comprises the steps of: providing a substrate, which substantially comprises aluminum, an aluminum alloy, magnesium or an magnesium alloy. Depositing a inorganic passivation layer by a wet chemical process directly onto the substrate and subsequently depositing an organic modified polysiloxane layer directly onto the passivation layer. The organic modified polysiloxane layer comprises nano scale particles.

The two layers of the two layer coating are deposited onto the substrate throughout separate process steps. The two layers therefore may be deposited using different deposition processes, which are based on differing principles. Furthermore, the two layers may comprise differing compositions.

A solution, at least comprising a water soluble Cr(III) salt and a alkali metal salt, in particular a alkali metal hexafluorozirconate, such as sodium hexafluorozirconate, is provided and deposited onto the surface of the substrate. The solution may also comprise a water soluble thickener and a water soluble surface active agent. Such solutions are described in U.S. Pat. No. 6,375,726, U.S. Pat. No. 6,521,029 and in U.S. Pat. No. 6,527,841 and may be produced using the methods described therein. U.S. Pat. No. 6,375,726, U.S. Pat. No. 6,521,029 and U.S. Pat. No. 6,527,841 are herewith explicitly and fully incorporated by reference.

The solution deposited will be dried and a heating treatment is conducted to form the passivation layer.

In one embodiment the first passivation layer also is a conversion layer. A conversion layer shows the characteristics, that components of the processing solution chemically react with the surface of the substrate, whereby a corrosion protection layer is formed directly on the substrate into which both the components of the processing solution as well as the metal atoms from the metal surface are incorporated.

The second polysiloxane layer may be deposited using a sol-gel process. During a sol-gel process a compound having a polymer network may be created through colloidally distributed nano particles from a solution. This sol-gel compound may be deposited onto the first passivation layer to form the nano scale polysiloxane layer. In one embodiment the formed cross-linked polymer layer comprises corrosion resistant hydrophobic properties.

In one embodiment the organic modified polysiloxane layer comprises epoxy substituted polysiloxanes and blocked isocyanates. During curing the epoxy substituted polysiloxanes are cross-linked to form a polymer network via the inherently blocked isocyanates. Thereby the second layer is formed.

A part of an exhaust system of a vehicle, a waste gas tube or a part used in an acid containing atmosphere at temperatures of up to 120° C. and even up to 250° C. may be provided as a substrate. The substrate may be a part of a heating system or a thermal system.

The passivation layer may be deposited using dipping or spraying. The polysiloxane layer may be deposited using dipping, spraying or pulverization. These deposition methods have the advantage that complex forms may be coated completely and reliably within a short amount of time.

In one embodiment of the invention the substrate is first thoroughly cleaned. The cleaning procedures are selected both according to the composition of the surface as well as to the layer to be deposited. The substrate may be cleaned using aqueous alkaline cleaning agents. This may improve the adhesion of the first passivation layer on the substrate as well as may improve the coverage of the first passivation layer. In further steps the substrate may subsequently be cleaned by an acid or alkaline etchant and by an acid activation of the surface.

In one embodiment the passivation layer is deposited to a layer weight of 100 mg/m$^2$ to 500 mg/m$^2$.

In a further method step at least the surface of the passivation layer may be dried after the deposition of the passivation layer. This improves the adhesion of the upper second polysiloxane layer onto the first passivation layer and also provides a more reliable coating, since water and/or organic components of the lower first layer are not vaporized after the deposition of the second polysiloxane layer. Therefore, the formation of blisters and holes in the coating is avoided. Following the deposition of the polysiloxane layer the polysiloxane layer may be cured in a further method step.

The invention will now be described in more detail with reference to the accompanying drawings and the further non-limiting exemplary embodiments that follow.

Substrate 1 consists of an aluminum alloy and is, for example, part of an exhaust system. At least one surface 2 of the substrate 1 is coated with a first passivation layer 3. This passivation layer 3 is inorganic, free of phosphate and free of Cr(VI). In this embodiment, the passivation layer 3 at the same time is a conversion layer, which is formed from metal ions of the deposited solution and from metal ions of the substrate material. In this embodiment the first passivation layer 3 comprises aluminum and magnesium from the substrate as well as Cr, Zr and Na from the solution deposited thereon. This composition is evident in the mass spectrum of FIG. 5. This first passivation layer 3 has a thickness of approximately 500 nm.

A second layer 4 is positioned on the passivation layer 3. This second layer 4 is a cross-linked polymer layer, in which epoxy substituted polysiloxanes are cross-linked through inherently blocked isocyanates during curing. The composition of the second layer 4 is evident in the mass spectra of FIGS. 2 and 3. This second layer 4 also is free of phosphate and free of Cr(VI). The second layer 4 has a thickness of 2 to 2.5 μm. These two layers 3 and 4 form a corrosion protection coating.

A substrate of aluminum, of a aluminum alloy, magnesium or a magnesium alloy was provided and cleaned using commercially available aqueous alkaline cleaning agents. A Cr(VI) free passivation layer was directly deposited onto the surface of the substrate by dipping.

A solution, at least comprising a water soluble Cr(III) salt and an alkali metal salt, in particular a alkali metal hexafluorozirconate such as sodium hexafluorozirconate, is provided and deposited onto the surface 2 of the substrate 1. The solution may also be a water soluble thickener and may comprise a water soluble surface active agent. Such solutions are described in U.S. Pat. Nos. 6,375,726, 6,521,029 and 6,527,841 and may be provided and utilized using the methods disclosed therein.

Useful solutions on this basis are commercially available from the company SurTec Deutschland GmbH. The first passivation layer was produced using one of the Cr(III) containing products SurTec 650 and SurTec 651 form SurTec Deutschland GmbH, Zwingenberg, Germany.

Also, the completely chrome free product Iridite NCP from MacDermid Inc., Denver, USA, was used to produce a first passivation layer.

These commercially available products have been applied onto the cleaned surface of the substrate according to the manufacturer's specification. The first passivation layer is deposited with a layer weight of 250 mg/m$^2$ and is then dried.

The results form the tests illustrated in FIGS. 4 to 7 show that a passivation layer is formed from the wet chemical deposited solution which comprises metal ions of the surface as well as metal ions of the solution deposited thereon. The passivation layer 3 therefore may be denoted a conversion layer, which is defined by the chemical reaction of components of the processing solution with the surface of the substrate, whereby a corrosion protection layer is directly formed onto the substrate into which both components of the processing solution as well as metal atoms or metal ions from the metal surface are incorporated.

A second solution was provided in order to produce the polysiloxane layer 4. This second solution is a curable composition comprising at least a hydrolysis product of an organosilane having an epoxy group as a functional group, and comprising at least a blocked polyisocyanate. Such solutions are disclosed in DE 10 52 853.

Suitable solutions on this basis are commercially available from NTC Nano Tech Coatings GmbH. The product Clearcoat U-Sil 120 BW as well as Clearcoat U-Sil 110 from NTC Nano Tech Coatings GmbH, Tholey, Germany was used to produce the second upper polysiloxane layer. The second solution was deposited onto the first passivation layer using a spraying process and was cured subsequently to form the second polysiloxane layer.

The specifications given by the producer were used to deposit the second polysiloxane layer and to cure the deposited layer. During the curing process the epoxy substituted polysiloxane is cross-linked via the inherently blocked isocyanates. The second layer forms to a dense polymer network via nano particles. The thickness d of the second layer may be in the range of 1 $\mu m \leq d \leq 30$ $\mu m$. In this embodiment the thickness according to below described tests is in the range of 2 μm to 2.5 μm. An improved corrosion protection can already be reached with layer thicknesses ranging from 1 μm to 2 μm. An overall thickness of the two layer coating in the range of 2 $\mu m \leq d \leq 25$ $\mu m$ has also proven to be suitable.

The corrosion resistance of the substrates coated according to the invention is tested in highly corrosive atmospheres. Aluminum substrates coated with a first layer that is a wet chemical deposited passivation layer and a second layer that is an upper nano scale polysiloxane layer according to the invention have been provided. The corrosion resistance of these substrates in highly corrosive atmospheres was tested by condensed water climate change tests (DIN ISO 3231) in sulfur dioxide atmosphere. 30 test cycles were conducted.

Following the condensed water climate change tests the substrates were inspected. Only a light discoloration but no corrosion and no delaminating of the two layer coating were observed. The results of these tests indicate that the substrates comprising a two layer coating according to the invention are resistant during a substantially longer amount of time under the above mentioned test conditions than substrates only comprising one single layer of the coating combination according to the invention. Al substrates and Mg substrates, comprising a Cr(VI) free two layer coating according to the invention are long-term corrosion resistant against highly corrosive media such as exhaust gases and waste gases, even at high temperatures.

The layered structure including the composition as well as the layer thickness of the substrates according to the invention was tested using laser desorption mass spectroscopy, LAMMA, and secondary neutral parts spectroscopy, SNNS. Substrates comprising a two layer coating from a first inorganic passivation layer and an isocyanate cross-linked polymer layer thereon and according to the invention as well as comparative substrates comprising a single isocyanate cross-linked polymer layer have been tested. The first passivation layer was produced using the product SurTec 650 and the second layer was produced using the product Clearcoat U-Sil 120 BW.

The surface of each sample was irradiated at approximately 20 positions using a laser. The recording of the mass spectra was conducted at different locations starting from the surface all the way into the depth down to the aluminum basis material. The sample area analyzed per laser pulse was in the range of approximately 1 to 20 μm$^2$. The residual gas pressure in the testing chamber was 0.5 nbar. The analysis was conducted so that a depth profile was generated at each position. The nearly constant ablation rate per laser pulse was approximately 80 to 1209 Nanometer.

The coating structure is irradiated at the surface using a Nd:YAG-Laser and the coating, using mass spectroscopy, is analyzed layer by layer via a depth profile starting from the upper layer (organic modified polysiloxane sol gel layer) through the conversion layer until reaching the aluminum substrate.

Figure 2:
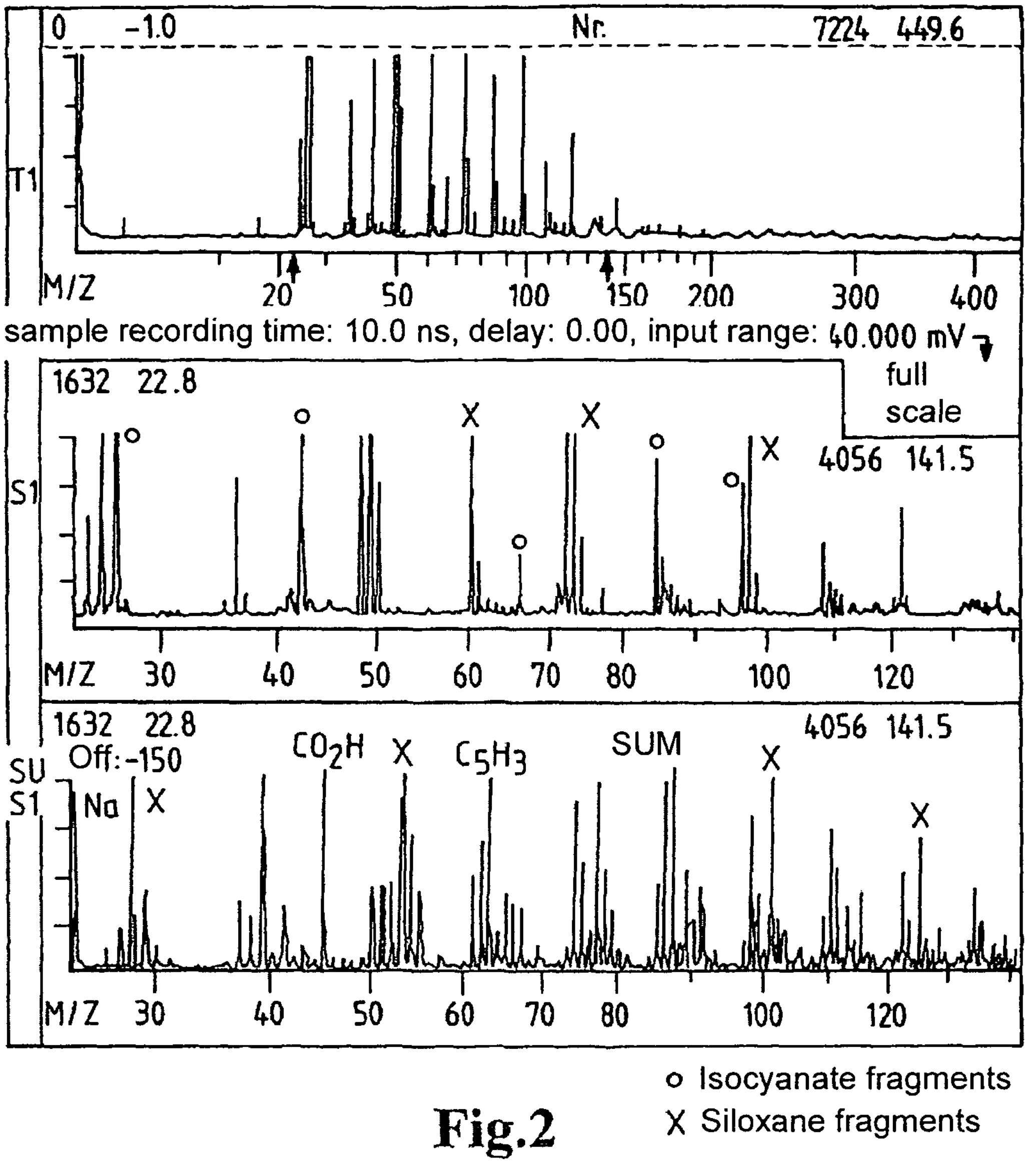
FIG. 2 is a graph showing mass spectra of an organic modified polysiloxane layer according to an embodiment disclosed herein.
Figure 3:
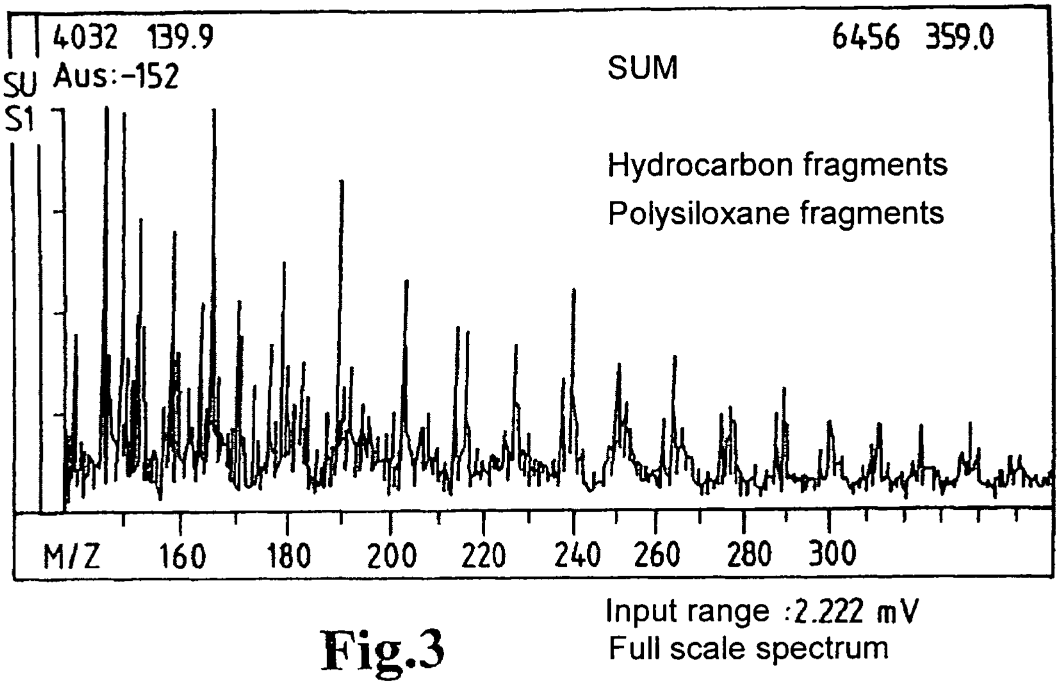
FIG. 3 is a graph showing a mass spectrum of a organic modified polysiloxane layer according to an embodiment disclosed herein.

The FIGS. 2 and 3 show mass spectra of the second organic modified polysiloxane layer produced using a sol-gel process. The mass spectrum shows isocyanate fragments and siloxane fragments of the organic modified polysiloxane layer. FIG. 2 shows the mass number from 0 to 140. The mass number from 140 to 360 can be seen in FIG. 3.

Figure 4:
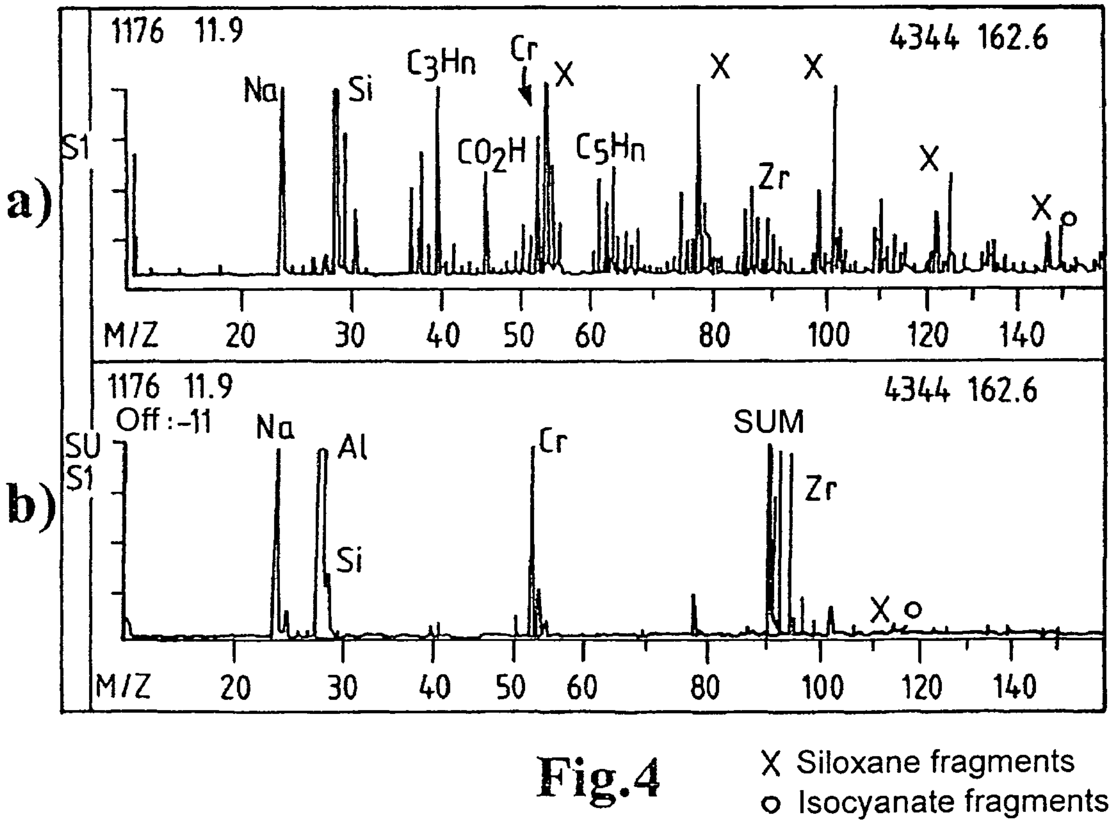
FIG. 4 is a graph showing mass spectra of the interface between the organic modified polysiloxane layer and the passivation layer on a coated layer according to an embodiment disclosed herein.

FIG. 4 shows a mass spectrum (a) of the interface layer between the second organic modified polysiloxane layer and the first passivation layer and a mass spectrum (b) of the passivation layer. Here, both significant components of the passivation layer as well as zirconium and chromium and polysiloxane fragments and isocyanate fragments of the sol-gel layer can be seen.

Figure 5:
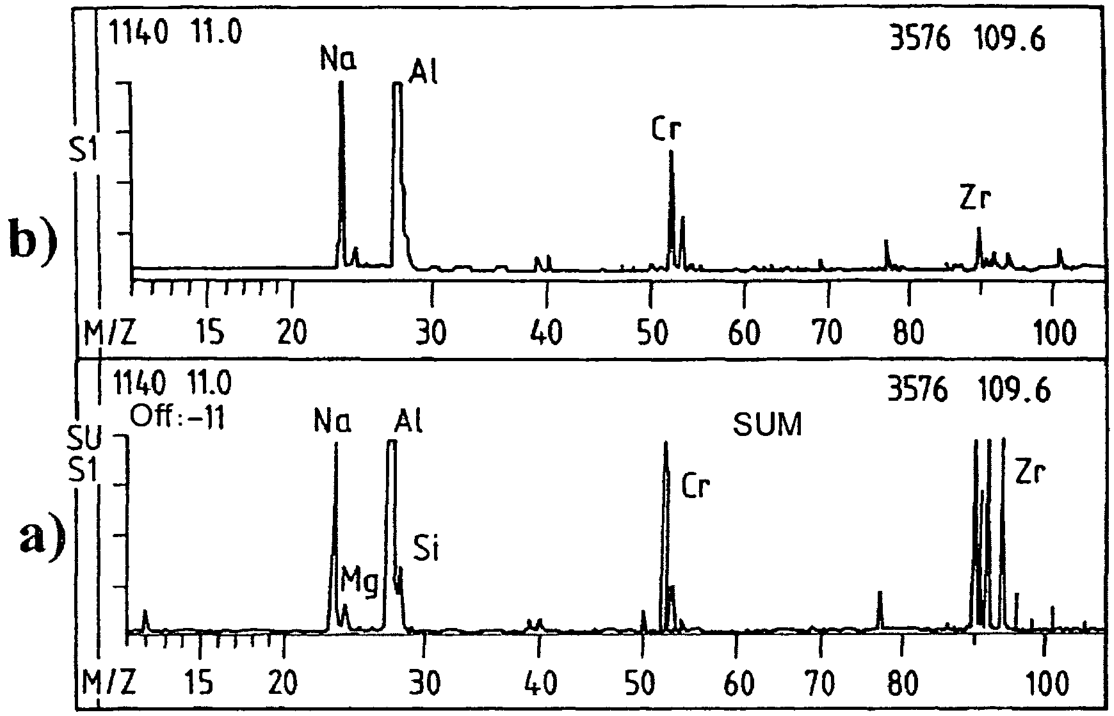
FIG. 5 is a graph showing mass spectra of the passivation layer within the passivation layer and at the interface of the passivation layer with the substrate material on a coated substrate according to an embodiment disclosed herein.

FIG. 5 shows a mass spectrum (a) of the first passivation layer within the layer and a mass spectrum (b) at the interface layer to the substrate material. The passivation layer, besides the components of the passivation solution such as zirconium and chromium, also comprises components of the basic material such as aluminum, silicon and magnesium. The passivation layer therefore may be denoted a conversion layer, as it comprises layer components of the basic material and of the passivation solution.

Figure 6:
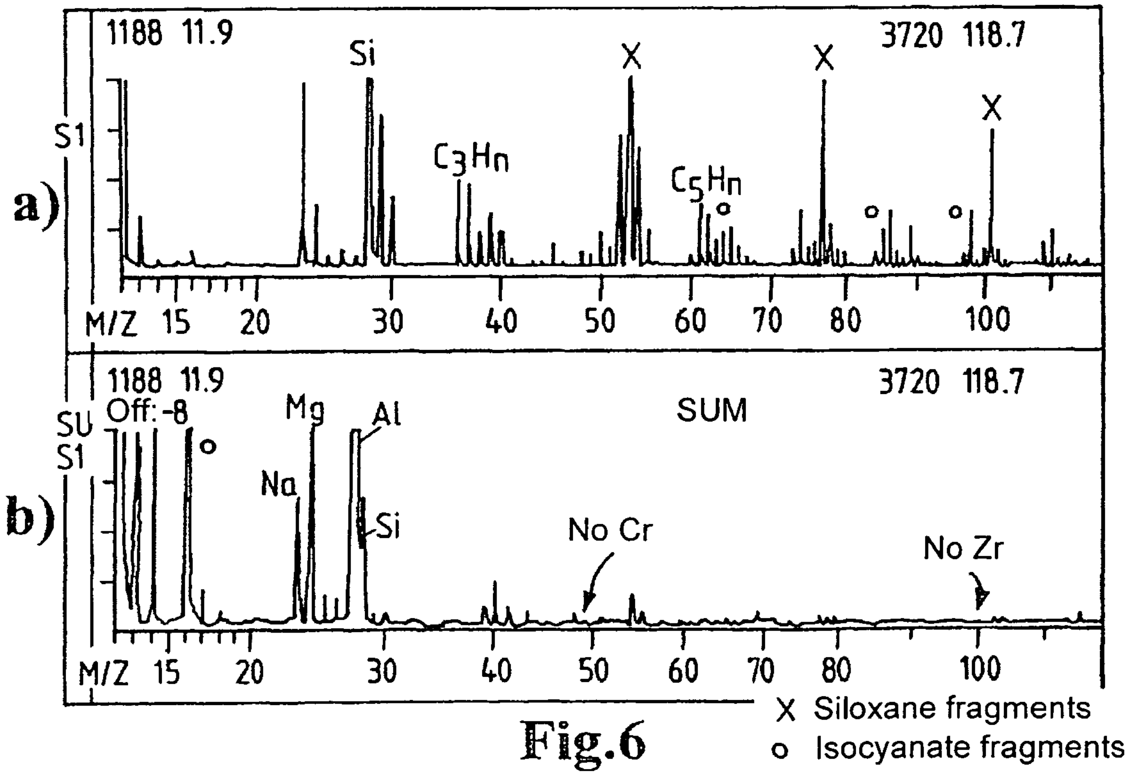
FIG. 6 is a graph showing mass spectra of a comparative substrate without a passivation layer but coated with a polysiloxane.

A comparative measurement was conducted. Substrates comprised of an Al alloy and a polysiloxane layer have been produced with the solution that was used with the substrates of FIGS. 2 to 5. These comparative substrates did not comprise a passivation layer. The polysiloxane layer, therefore, is directly positioned onto the basic substrate. FIG. 6 shows mass spectra from this comparative substrate, which comprises a polysiloxane layer (mass spectrum (a)) but does not comprise a passivation layer.

Figure 7:
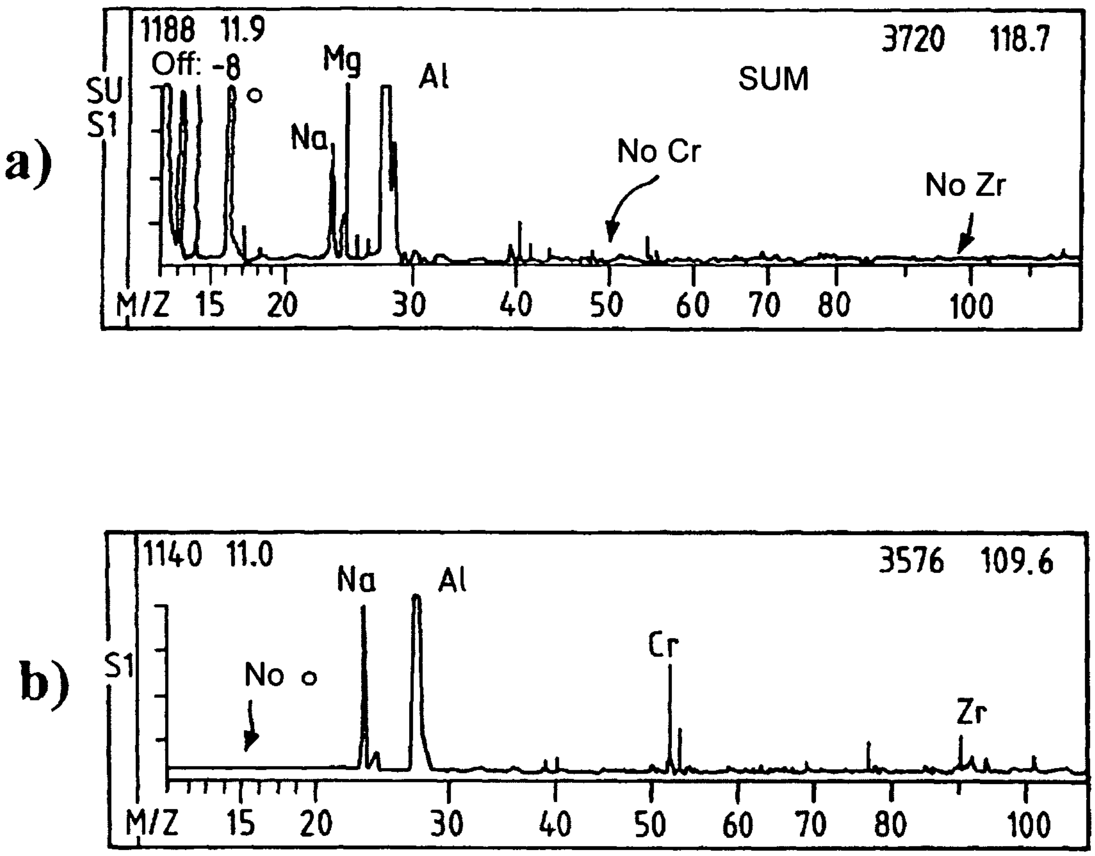
FIGS. 7*a* and 7*b* are graphs showing mass spectra of the interface layer between the substrate and the passivation layer of a coated substrate according to an embodiment of the invention (FIG. 7*b*) and between the substrate and a polysiloxane layer directly positioned on the substrate and not according to the invention (FIG. 7*a*).

FIG. 7 shows a comparison of the interface layer between the substrate and the passivation layer of a substrate according to the invention (mass spectrum (b)) and of the interface layer between the substrate and a polysiloxane layer directly positioned on the substrate (mass spectrum (a)). It can be noted, that significantly more oxygen is present in the interface layer of the comparative substrate not comprising a passivation layer.

This would promote the corrosion of the surface of the basic substrate.

In summary the LAMMA tests show that the surface composition is constant across the whole area analyzed. The second polysiloxane layer produced using a sol-gel process is not interrupted. No inhomogeneities, micro holes or embedded foreign particles have been found. This second, or upper cover layer, produced from siloxane and isocyanate, is non conductive and significantly thicker than the passivation layer and conversion layer directly positioned underneath, respectively. The crossover width of the passivation layer to the aluminum is wider than the one to the polysiloxane layer. The zirconium at least partly is present as zirconium oxide.

The comparison with the substrate not comprising a passivation layer indicates that this comparative one layer coating is thinner than the two layer coating. The oxygen content at the interface between the polysiloxane layer and the aluminum substrate of the comparative substrate is higher than at the interface between the passivation layer and the aluminum substrate of the substrate according to the invention comprising a two layer coating.

Substrates made of Al die cast alloys AlSi12, AlMg3Si, AlSi10Mg, AlSi9Cu3 and AlMg9 as well as made of Al forged alloys AlMg1, AlMg1.5, AlMgSi0.5 and AlZnMgCu0.5 and made of the magnesium alloys AN50, AN60 and AZ91 may as well be coated with a two layer coating according to the invention. These substrates also show good corrosion resistance in acid containing media at high temperatures. This result is demonstrated by water condensing climate change tests (DIN ISO 3231) in sulfur dioxide atmosphere.

The invention claimed is:

1. A corrosion-resistant coated substrate having a Cr(VI) free corrosion resistant coating, comprising:
- a substrate comprising a metal or metal alloy selected from aluminum, an aluminum alloy, magnesium or a magnesium alloy,
- a wet chemical deposited inorganic passivation layer, which is a conversion layer comprising both components of the wet chemical deposited layer and components of the substrate, which comprises Cr(III) and further comprises Na or K, and which is free of phosphate, directly positioned on the surface of the substrate, and
- an organic modified polysiloxane layer, which comprises epoxy substituted polysiloxanes crosslinked via blocked isocyanates and comprises nanoscaled particles, directly positioned on the surface of the inorganic passivation layer.

2. The substrate of claim 1, wherein the organic modified polysiloxane layer is free of phosphate.

3. The substrate of claim 1, wherein the inorganic passivation layer has a layer weight in the range of 100 $mg/m^2$ to 500 $mg/m^2$.

4. The substrate of claim 1, wherein the inorganic passivation layer has a thickness a of $0.2\ \mu m \leq a \leq 2\ \mu m$.

5. The substrate of claim 1, wherein the organic modified polysiloxane layer has a thickness d, wherein $1\ \mu m \leq d \leq 30\ \mu m$.

6. The substrate of claim 5, wherein the organic modified polysiloxane layer has a thickness d, wherein $1\ \mu m \leq d \leq 3\ \mu m$.

7. The substrate of claim 1, wherein the organic modified polysiloxane layer is nano crystalline.

8. The substrate of claim 1, wherein the substrate comprises a die cast aluminum alloy.

9. The substrate of claim 8, wherein the die cast aluminum alloy comprises AlSi12, AlSi12(Cu), AlMg3Si, AlSi10Mg, AlSi10Mg(Cu), AlSi9Cu3 or AlMg9.

10. The substrate of claim 1, wherein the substrate comprises an Al forging alloy.

11. The substrate of claim 10, wherein the Al forging alloy comprises AlMg1, AlMg1.5, AlMgSi0.5 or AlZnMgCu0.5.

12. The substrate of claim 1, wherein the substrate comprises one of the magnesium alloys AZ91, AM50 or AM60.

13. A method of using the coated substrate of claim 1, comprising:
- exposing the substrate to an acid containing atmosphere at temperatures of up to approximately 250° C.

14. An exhaust gas system comprising the coated substrate of claim 1.

15. A heating system comprising the coated substrate of claim 1.

16. A method for producing the corrosion resistant coated substrate of claim 1, comprising:
- providing a substrate comprising one or more metals or metal alloys selected from aluminum, an aluminum alloy, magnesium or an magnesium alloy,
- depositing a Cr(VI) free inorganic passivation layer directly onto the surface of the substrate by a wet chemical process,
- depositing a Cr(VI) free organic modified polysiloxane layer directly onto the surface of the passivation layer.

17. The method of claim 16, wherein the substrate is part of an exhaust system of a vehicle, a part of a heating system, a part of a thermal system or a part of a waste gas system.

18. The method of claim 16, wherein depositing the passivation layer dipping the substrate in, or spraying the substrate with, a passivation solution.

19. The method of claim 16, wherein the deposition of the organic modified polysiloxane layer comprises dipping, spraying or pulverization.

20. The method of claim 16, further comprising cleaning the substrate surface with one or more aqueous alkaline cleaning agents.

21. The method of claim 20, further comprising subsequently cleaning the substrate surface with an acid or alkaline etchant and activating the surface with an acid.

22. The method of claim 16, wherein depositing the passivation layer results in a layer weight of 100 $mg/m^2$ to 500 $mg/m^2$.

23. The method of claim 16, further comprising drying at least the surface of the passivation layer following the deposition of the passivation layer.

24. The method claim 16, further comprising treating the deposited passivation layer so that a chemical reaction takes place between the solution deposited thereon and the substrate material, and thereby the passivation layer.

25. The method of claim 16, further comprising curing the organic modified polysiloxane layer following the depositing thereof.

26. The method of claim 25, wherein the curing comprises cross-linking one or more epoxy substituted polysiloxanes into a polymer network via blocked isocyanates.

27. The method of the curing comprises forming the organic modified polysiloxane layer via nano scale particles.

28. The substrate of claim 5, wherein the organic modified polysiloxane layer has a thickness d, wherein $2\ \mu m \leq d \leq 25\ \mu m$.

29. The substrate of claim 28, wherein the organic modified polysiloxane layer has a thickness d, wherein $5\ \mu m \leq d \leq 25\ \mu m$.

30. The exhaust gas system of claim 14, wherein the system provides exhaust gas recirculation in a vehicle.

31. A thermal system comprising the coated substrate of claim 1.

32. A waste gas system comprising the coated substrate of claim 1.

33. A method of reducing corrosion of a substrate having a surface containing aluminum, an aluminum alloy, magnesium, or a magnesium alloy, comprising:

applying a wet chemical deposited inorganic passivation layer directly to the surface of the substrate; and applying an organic modified polysiloxane layer directly to the surface of the inorganic passivation layer.

* * * * *